US008720984B2

(12) United States Patent
Kurogi et al.

(10) Patent No.: US 8,720,984 B2
(45) Date of Patent: May 13, 2014

(54) VEHICLE-BODY STRUCTURE OF VEHICLE AND MANUFACTURING METHOD OF THE SAME

(75) Inventors: Osamu Kurogi, Hiroshima (JP);
Tsuyoshi Sugihara, Hiroshima (JP);
Kohya Nakagawa, Hiroshima (JP);
Kuniaki Nagao, Hiroshima (JP);
Sakayu Terada, Hiroshima (JP); Miho Kowaki, Hiroshima (JP); Akira Iyoshi, Hiroshima (JP); Shigeaki Watanabe, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 13/600,080

(22) Filed: Aug. 30, 2012

(65) Prior Publication Data
US 2013/0049408 A1 Feb. 28, 2013

(30) Foreign Application Priority Data
Aug. 31, 2011 (JP) .................................. 2011-189061

(51) Int. Cl.
*B62D 25/02* (2006.01)
(52) U.S. Cl.
USPC .............................. 296/205; 296/209; 296/30
(58) Field of Classification Search
USPC ........................ 296/205, 209, 187.02, 29, 30
See application file for complete search history.

(56) References Cited

U.S. PATENT DOCUMENTS

| 6,357,819 | B1* | 3/2002 | Yoshino | 296/187.02 |
|---|---|---|---|---|
| 7,077,461 | B2* | 7/2006 | Ratet | 296/187.02 |
| 7,513,564 | B2* | 4/2009 | Yamazaki | 296/187.02 |
| 7,784,186 | B2* | 8/2010 | White et al. | 29/897.2 |
| 2002/0033618 | A1* | 3/2002 | Kwon | 296/203.03 |

FOREIGN PATENT DOCUMENTS

| JP | 59-182472 U | 12/1984 |
|---|---|---|
| JP | 60-097673 U | 7/1985 |
| JP | 2009-202620 A | 9/2009 |
| JP | 2011-201425 A | 10/2011 |
| JP | 2011-255815 A | 12/2011 |
| JP | 2012-017084 A | 1/2012 |

* cited by examiner

*Primary Examiner* — Dennis H Pedder
(74) *Attorney, Agent, or Firm* — Studebaker & Brackett PC

(57) ABSTRACT

In a vehicle-body structure of a vehicle which comprises at least one vehicle-body forming member forming a closed-section portion continuously in a specified direction, a partition member extending in the specified direction and partitioning an inside of the closed-section portion, and a bulkhead provided in the closed-section portion and joined to the vehicle-body forming member, the bulkhead is joined to an inner face of the vehicle-body forming member at specified positions which are located on both sides of the partition member, and the bulkhead is joined to a specified portion of the partition member which is located in the vicinity of opening portions formed at the partition member or to an end portion of the partition member in the specified direction.

3 Claims, 12 Drawing Sheets

VEHICLE-BODY STRUCTURE OF VEHICLE AND MANUFACTURING METHOD OF THE SAME

BACKGROUND OF THE INVENTION

The present invention relates to a vehicle-body structure of a vehicle and a manufacturing method of the same.

Vehicles, such as automotive vehicles, are required to increase the rigidity of a vehicle body in order to improve the comfortable ride and the safety. A reinforcing member is provided in a closed-section portion formed by a vehicle-body forming member as a technology to increase the rigidity of the vehicle body. Further, a structure in which an inside of the closed-section portion is partitioned by a partition member is used in the vehicles, such as the automotive vehicles, and Japanese Utility Model Laid-Open publication No. 59-182472 and Japanese Patent Laid-Open publication No. 2009-202620, for example, disclose the technology in which the bulkhead is provided in the closed-section portion of the above-described structure.

The first one of the above-described publications discloses the technology in which, as shown in FIG. 4 of this publication, the inside of the closed-section portion of the side sill formed by the side sill outer and the side sill inner is partitioned by the side sill center, wherein the bulkhead is arranged in a bamboo-joint shape in a space enclosed by the side sill center and the side sill outer. Herein, the bulkhead has flanges at its periphery, and the flanges are joined to the respective inner faces of the side sill center and the side sill outer by both spot welding and adhesive agent.

The second one of the above-described publications discloses the technology in which, as shown in FIGS. 9 and 10 of this publication, the inside of the closed-section portion of the side sill is partitioned by the center pillar inner, wherein the separate bulkheads are arranged in a bamboo-joint shape both in a space enclosed by the center pillar inner and the side sill outer and in another space enclosed by the center pillar inner and the side sill inner.

According to the technologies disclosed in the above-described publications, since the members to which the bulkheads are joined restrain each other, the rigidity of the vehicle-body forming members can be increased. Further, since the sectional shape of the vehicle-body forming members can be easily maintained, vibrations may be restrained form occurring to a certain degree.

However, in the structure having the closed-section portion disclosed in the above-described publications, the bulkhead is arranged only in one of the spaces which are located on both sides of the partition member (the side sill center or the center pillar inner) in the closed-section portion, so that this bulkhead has a function of merely maintaining the sectional shape of this one of the both-side spaces only. Therefore, in order to maintain the sectional shape of the other of the both-side spaces as well, it may be necessary to arrange the bulkhead on the both sides of the partition member in the closed-section portion like the technology disclosed in the second publication described above. This may cause improper increases of parts number or attaching work steps.

SUMMARY OF THE INVENTION

An object of the present invention is to provide a vehicle-body structure of a vehicle or a manufacturing method of the same which can effectively restrain vibrations occurring at the closed-section portion with the bulkhead.

According to the present invention, there is provided a vehicle-body structure of a vehicle, comprising at least one vehicle-body forming member forming a closed-section portion continuously in a specified direction, a partition member extending in the specified direction and partitioning an inside of the closed-section portion of the vehicle-body forming member, and a bulkhead provided in the closed-section portion of the vehicle-body forming member and joined to the vehicle-body forming member, wherein the bulkhead is joined to an inner face of the vehicle-body forming member at specified positions which are located on both sides of said partition member, and the bulkhead is joined to a specified portion of the partition member which is located in the vicinity of an opening portion formed at the partition member or to an end portion of the partition member in the specified direction.

According to the present invention, since the inside of the closed-section portion formed by a single vehicle-body forming member made in a hollow-tube shape, for example, or two vehicle-body forming members joined together is partitioned by the partition member, the bulkhead provided in the closed-section portion is joined to the inner face of the vehicle-body forming member(s) at the specified positions located on the both sides of the partition member, and the bulkhead is joined to the specified portion of the partition member which is located in the vicinity of the opening portion formed at the partition member or to the end portion of the partition member in the specified direction, the sectional shape of the closed-section portion can be properly maintained on the both sides of the partition portion with the bulkhead, avoiding any interference of the partition member with the bulkhead. Accordingly, the rigidity of the vehicle-body forming member(s) at this portion can be improved, and vibrations can be effectively restrained from occurring at this portion.

According to an embodiment of the present invention, the closed-section portion of the vehicle-body forming member is comprised of two vehicle-body forming members which are joined together via at least a pair of joint portions, a portion or a whole portion of the partition member is provided to extend over the pair of joint portions, and the bulkhead is joined to the two vehicle-body forming members, respectively. Thereby, since the bulkhead is joined to the two vehicle-body forming members forming the closed-section portion, respectively, the vibration occurrence at the vehicle-body member can be effectively restrained.

According to another embodiment of the present invention, the vehicle-body forming member includes a side sill inner and a side sill outer reinforcement which constitute a side sill extending in a vehicle longitudinal direction, and the partition member is a pillar inner which constitutes a pillar extending vertically. Thereby, the above-described vibration-occurrence restraint effect can be provided in the structure in which the inside of the closed-section portion formed by the side sill inner and the side sill outer reinforcement is partitioned by the pillar inner.

According to another embodiment of the present invention, a joint portion of the bulkhead and the side sill inner and a joint portion of a cross member which extends in a vehicle width direction and the side sill inner are provided to overlap each other in the vehicle longitudinal direction. Thereby, the sectional shape of the closed-section portion at this portion can be maintained further effectively, so that the above-described vibration-occurrence restraint effect can be increased.

According to another embodiment of the present invention, a joint portion of the vehicle-body forming member and the bulkhead includes a rigid joint portion where the vehicle-body forming member and the bulkhead are joined with a direct contact thereof and a flexible joint portion where the vehicle-body forming member and the bulkhead are joined via a damping member provided therebetween. Thereby, the vehicle-body forming member and the bulkhead can be firmly joined with the rigid portion by means of welding or bolt fastening, thereby ensuring the above-described rigidity improvement effect, and vibrations of the vehicle-body forming member can be reduced by the damping member provided at the flexible joint portion. Accordingly, the desired rigidity of the vehicle-body structure is ensured and vibration transmission is restrained, so that the comfortable ride of a vehicle can be improved and the noises can be reduced. Herein, it may not be required to provide any additional member to restrain the vibration transmission, so that the above-described effects can be advantageously provided, avoiding any improper weight increase of the vehicle body or the like.

According to another embodiment of the present invention, the damping member is a viscoelastic member having physical properties which fall within a range enclosed by six coordinate points: (1, 0.4), (1, 0.2), (10, 0.1), (2000, 0.1), (10000, 0.2) and (10000, 0.4) in an X-Y coordinate system with X axis of the storage modulus and Y axis of the loss factor, or a range exceeding the loss factor of 0.4. Thereby, since the viscoelastic member is used as the damping member and the storage modulus and the loss factor as its physical properties are specified as any values falling within the specified range which has been confirmed as an effective range capable of providing the vibration-damping effect, the above-described damping effect of vibrations of the vehicle-body forming member can be surely provided.

According to another embodiment of the present invention, the bulkhead comprises a pair of partition wall portions which partitions the closed-section portion of the vehicle-body forming member and a connection portion which connects the pair of partition wall portions. Thereby, the above-described effect can be effectively provided.

According to another embodiment of the present invention, the joint portion of the partition member and the bulkhead includes a flexible joint portion where the partition member and the bulkhead are joined via a damping member provided therebetween. Thereby, vibrations transmitting between the partition member and the bulkhead can be reduced by the damping member.

According to another aspect of the present invention, there is provided a manufacturing method of a vehicle-body structure of a vehicle which comprises at least one vehicle-body forming member forming a closed-section portion continuously in a specified direction, a partition member extending in the specified direction and partitioning an inside of the closed-section portion of the vehicle-body forming member, and a bulkhead provided in the closed-section portion of the vehicle-body forming member and joined to the vehicle-body forming member, the method comprising a step of joining the bulkhead to an inner face of the vehicle-body forming member at specified positions which are located on both sides of the partition member, and a step of joining the bulkhead to a specified portion of the partition member which is located in the vicinity of an opening portion formed at the partition member or to an end portion of the partition member in the specified direction. A vehicle-body structure of a vehicle manufactured by this method can provide the same effects described above for the present invention.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

At first, results of simulation conducted to the structures specified in claims of the present invention will be described prior to descriptions of specific applicable structures to a vehicle body.

Figure 1:
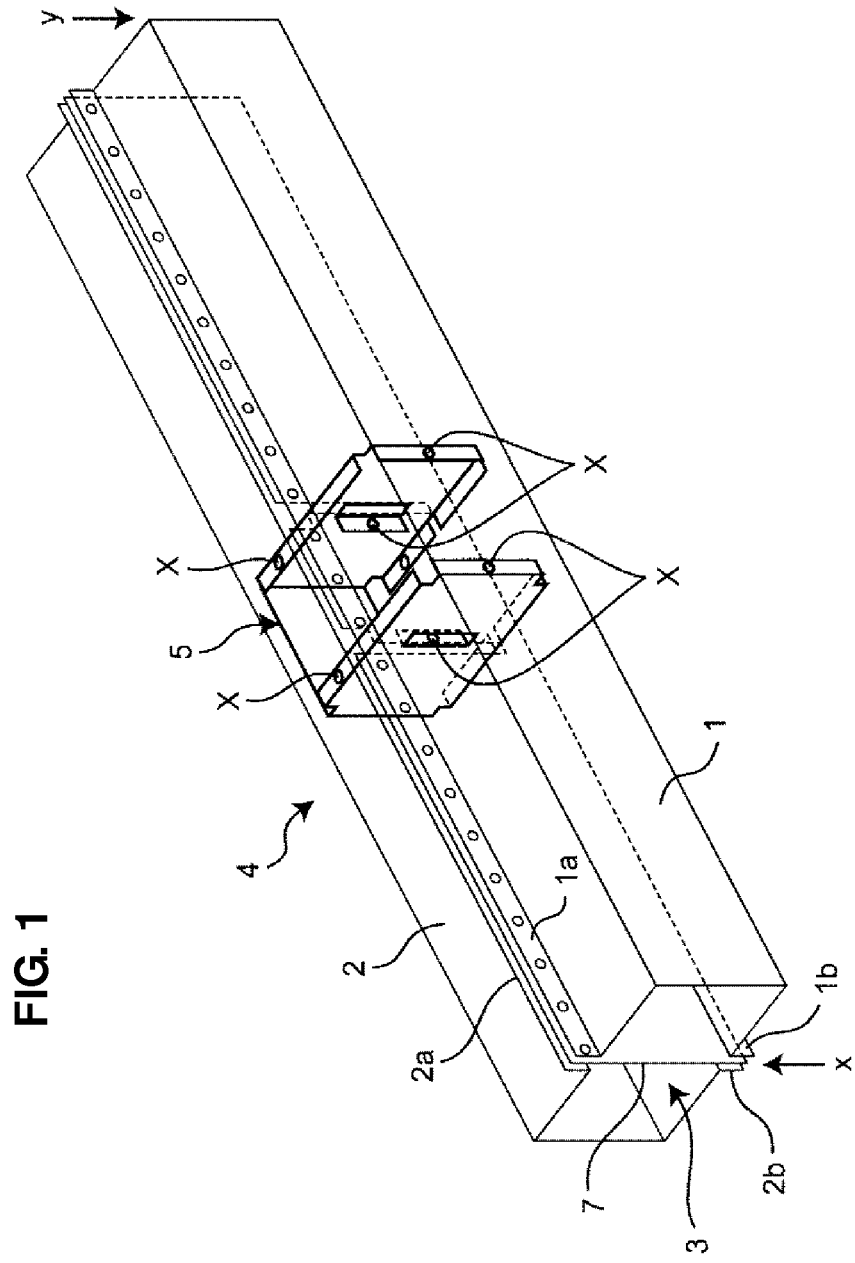
FIG. 1 is a diagram showing a rigid joint model A used for a simulation of an embodiment of the present invention.
Figure 2:
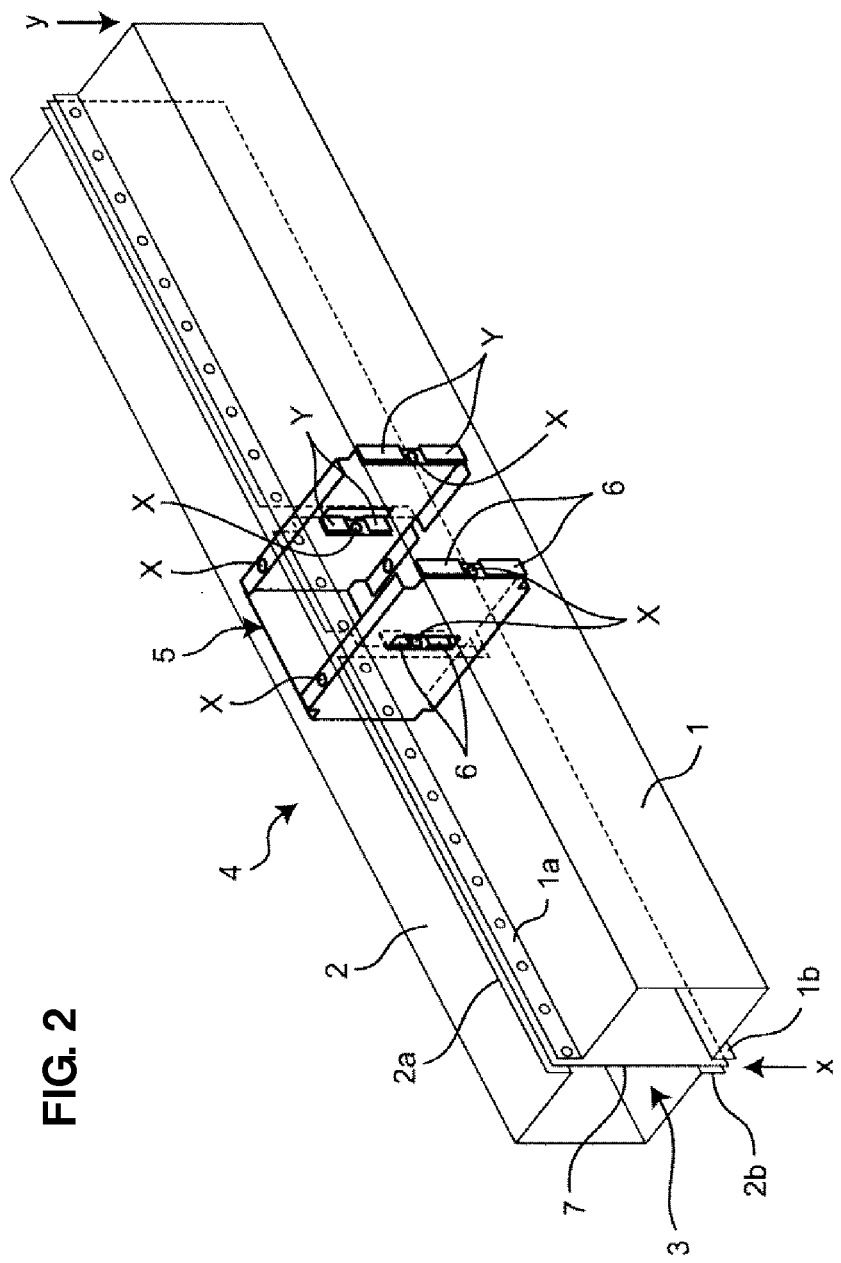
FIG. 2 is a diagram showing a rigid-flexible combined joint model B used for the simulation.

FIG. 1 is a diagram showing a rigid joint model A used for this simulation, and FIG. 2 is a diagram showing a rigid-flexible combined joint model B used for this simulation. In each model, a first member 1 and a second member 2 which have a U-shaped section respectively are used as a vehicle-body forming member, which form a hollow frame 4 having a closed-section portion 3 with a rectangular section by joining respective flanges of the first and second members 1, 2 together.

Figure 3:
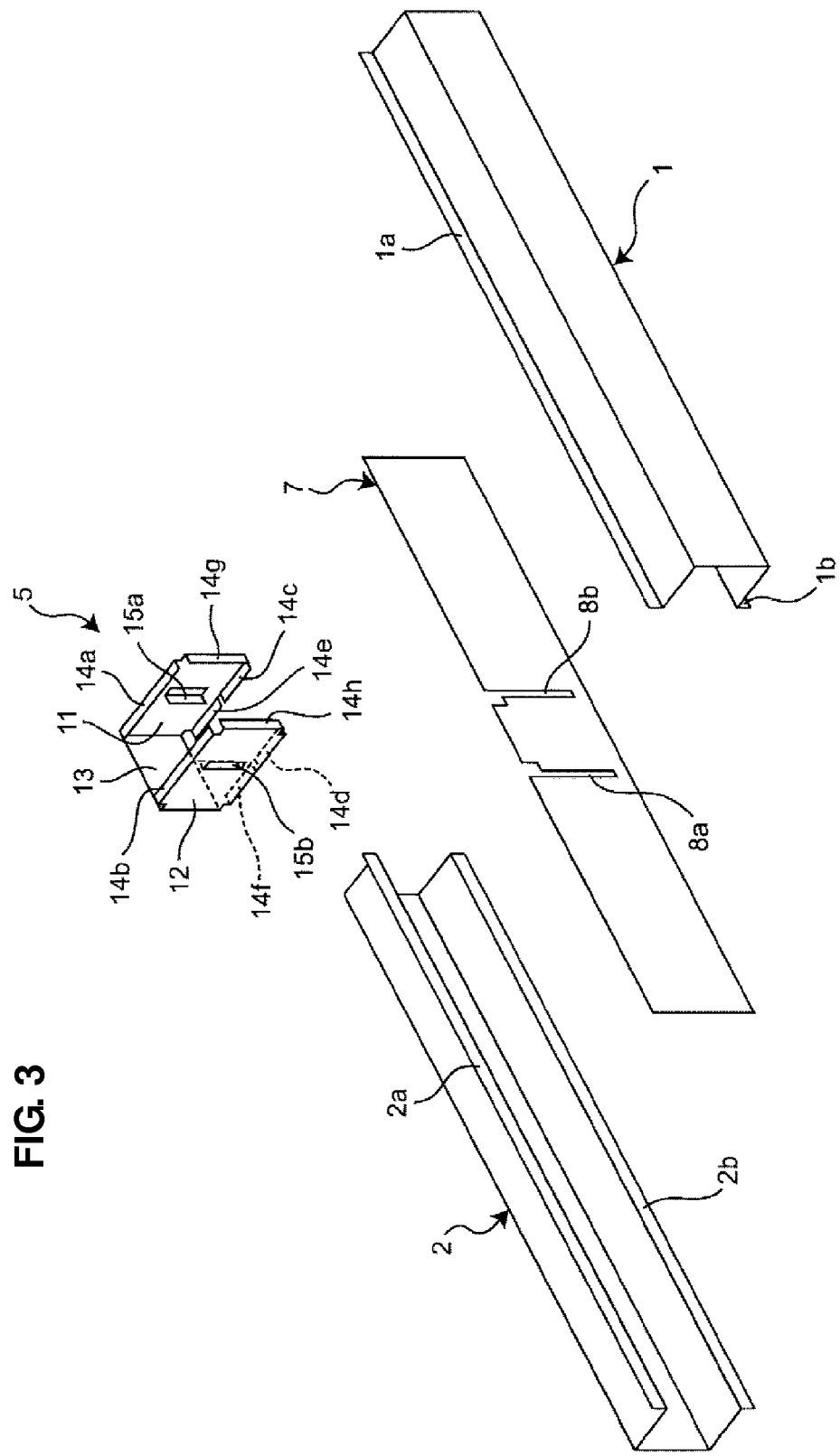
FIG. 3 is an exploded perspective view of the rigid-flexible combined joint model B shown in FIG. 2.

Further, in each of the models A, B, a partition member 7 which extends in a longitudinal direction of the hollow frame 4 is provided between both joint portions of the first member 1 and the second member 2. An inside of the closed-section portion 3 is partitioned by the partition member 7. Both ends, in a short-length direction, of the partition member 7 are arranged between flanges 1a, 1b, 2a, 2b of the first and second members 1, 2, and the both flanges 1a, 1b, 2a, 2b and the partition member 7 are overlapped and joined together. As shown in FIG. 3, the partition member 7 has a pair of slits 8a, 8b to avoid any interference of the partition member 7 with a bulkhead 5, which will be described later. The pair of slits 8a, 8b extends vertically.

Moreover, a bulkhead 5 is provided in the closed-section portion 3 in each model. As shown in FIG. 3, the bulkhead 5 comprises a pair of partition wall portions 11, 12 which is arranged along a face substantially perpendicular to a longitudinal direction of the hollow frame 4 and a connection portion 13 which interconnects the pair of partition wall portions 11, 12. The partition wall portions 11, 12 include respective central flanges 15a, 15b which are cut off partially from respective central portions of the partition wall portions 11, 12 and bend toward the inside of the bulkhead 5. Further, the partition wall portions 11, 12 include plural peripheral flanges 14 (14a, 14b, 14c, 14d, 14e, 14f, 14g, 14h) which bend toward the inside of the bulkhead 5 from a periphery of the partition wall portions 11, 12. As shown in FIGS. 1 and 2, the bulkhead 5 is joined to inner faces of the first and second members 1, 2 at the connection portion 13 and the plural peripheral flanges 14. Thereby, the bulkhead 5 is fixed in the frame 4. Moreover, it is avoided that the bulkhead 5 interferes with the partition member 7 by inserting the pair of partition wall portions 11, 12 into the slits 8a, 8b of the partition member 7. The central flanges 15a, 15b are joined to the partition member 7 at peripheral portions of the slits 8a, 8b.

In the rigid joint model A shown in FIG. 1, the bulkhead 5 is joined to the first and second members 1, 2 and the partition member 7 by spot welding. Meanwhile, in the rigid-flexible combined joint model B shown in FIG. 2, the bulkhead 5 is joined to the first and second members 1, 2 at the connection portion 13 and the peripheral flanges 14a, 14b, 14c, 14d, 14e, 14f only by spot welding, but the bulkhead 5 is joined to the partition member 7 and the first member 1 at the central flanges 15a, 15b and the peripheral flanges 14g, 14h by combination of rigid and flexible joining. Specifically, the central flanges 15a, 15b are joined to the partition member 7 at their central portions by spot welding and also at their both sides via damping members 6. The peripheral flanges 14g, 14h are joined to the first member 1 at their central portions by spot welding and also at their both sides via the damping members 6. Herein, the above-described joint portion with the spot welding constitutes a rigid joint portion X and the above-described joint portion via the damping member 6 constitutes a flexible joint portion Y.

Herein, while the model B equipped with both the rigid joint portion X and the flexible joint portion Y has a higher rigidity than the model A equipped with only the rigid joint portion X and therefore there exists a difference in the resonance frequency between the models A, B, in order to compare these models properly by making their resonance frequency uniform, the area of the rigid joint portion X of the model A is set to be slightly larger than that of the rigid joint portion X of the model B. Further, the damping member 6 provided at the flexible joint portion Y is comprised of a viscoelastic member which has the loss factor of 0.4 and the storage modulus of 200 MPa (20° C., 30 Hz).

Figure 4:
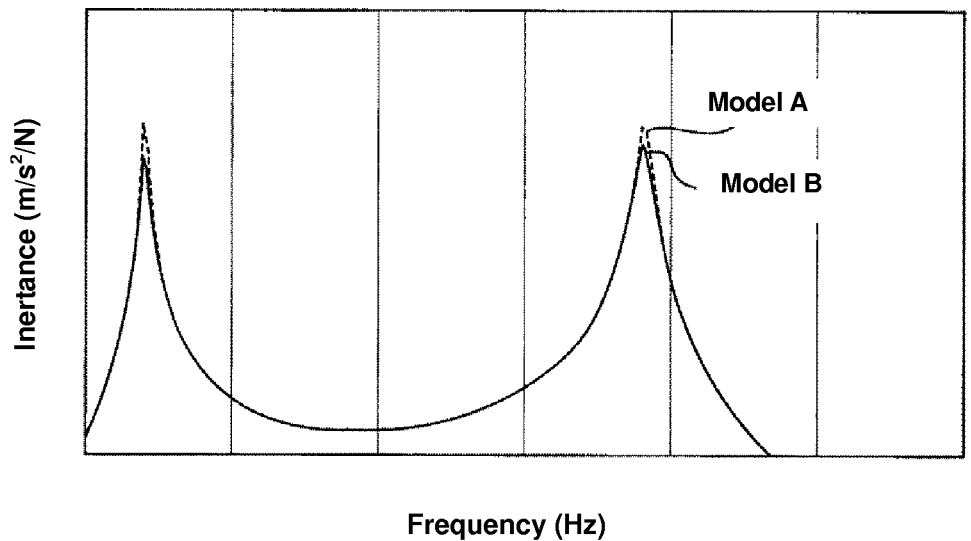
FIG. 4 is a characteristic graph of the inertance for the frequency, which shows results of the simulation.

FIG. 4 shows simulation results, which shows a comparison of the respective inertance at a responsive point y (a magnitude of an acceleration amplitude per an exciting force: $m/s^2/N$), in which in each of the models A, B, a central portion of a lower side of the closed-section portion 3 at one end of the frame 4 is set as an exciting point x and an upper-side corner portion of the closed-section face 3 at the other end of the frame 4 which is located on the side of the first member 1 is set as the responsive point y. As apparent from this figure, a peak value of the inertance of the rigid-flexible combined joint model B is lower than that of the rigid joint model A. Accordingly, it is shown that the amount of damping occurring in the process of vibration transmission from the exciting point x to the responsive point y becomes greater by providing the flexible joint portion Y.

Figure 5:
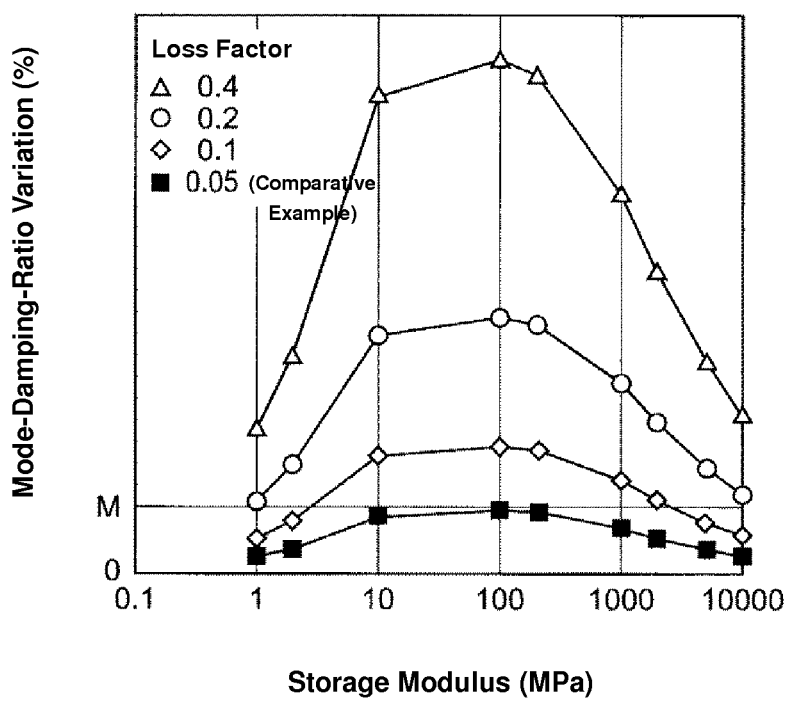
FIG. 5 is a characteristic graph of the mode-damping-ratio variation for the storage modulus, which shows results of the simulation.

FIG. 5 shows simulation results of a mode-damping-ratio variation characteristic for the storage modulus and the loss factor when using plural viscoelastic members having different values of the loss factor as the damping member 6 in the above-described rigid-flexible combined joint model B. Herein, the damping member having the loss factor of 0.05 is a comparative sample, which is an adhesive agent for structure generally used in the vehicle body.

As apparent from this figure, it is shown that the mode-damping-ratio variation in a case of using the viscoelastic member is greater than that in a case of using the general adhesive agent for structure (the loss factor of 0.05) in a whole area of the storage modulus, thereby damping the vibration more easily. In particular, it is shown that the mode-damping-ratio variation becomes greater as the loss factor becomes greater, and that the mode-damping-ratio variation becomes the maximum when the storage modulus is 100 MPa regardless of the value of the loss factor.

Figure 6:
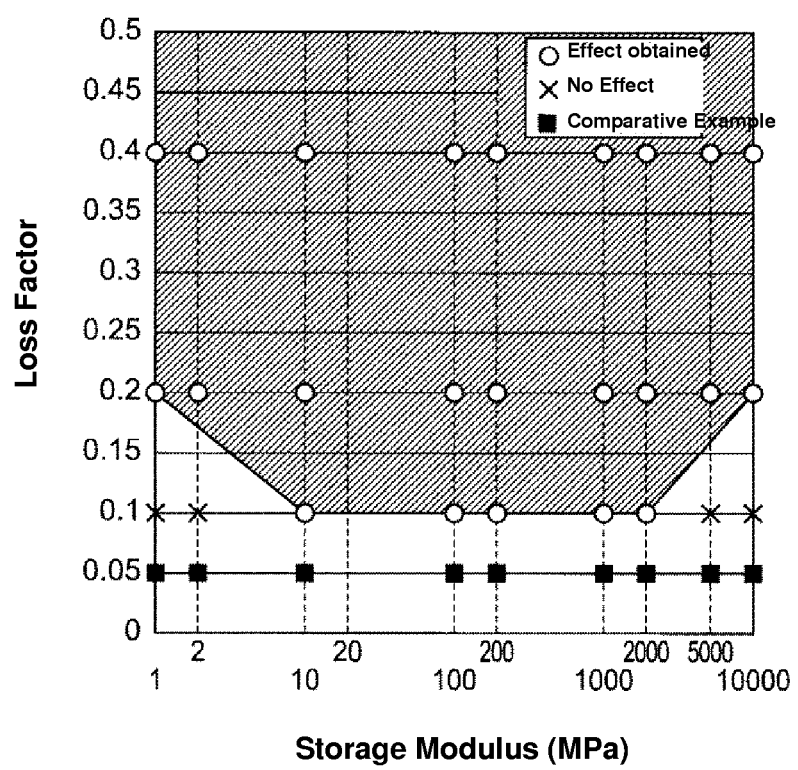
FIG. 6 is a graph showing an effective scope which is created based on the results of FIG. 5.

FIG. 6 shows relationships between the loss factor and the storage modulus which can substantially obtain the damping effect in a case in which the viscoelastic member is used as the damping member 6 from the simulation results of FIG. 5. In this figure, it is determined that the effect can be obtained in a case in which the mode-damping-ratio variation is a threshold M or greater which is shown in FIG. 5, while no effect can be obtained in a case in which the mode-damping-ratio variation is less than the threshold M.

Consequently, it has been found out that the damping effect can be obtained in substantially a range enclosed by six coordinate points: (1, 0.4), (1, 0.2), (10, 0.1), (2000, 0.1), (10000, 0.2) and (10000, 0.4) in an X-Y coordinate system with X axis of the storage modulus and Y axis of the loss factor, and a range exceeding the loss factor of 0.4.

Next, preferred embodiments in which the structure of the present invention is applied to the vehicle body will be described. In the descriptions below, terms showing directions, such as "forward," "rearward," "longitudinal," "right," "left" and "right and left," will generally indicate respective directions when the vehicle's advance direction is considered as the "forward" direction.

Figure 7:
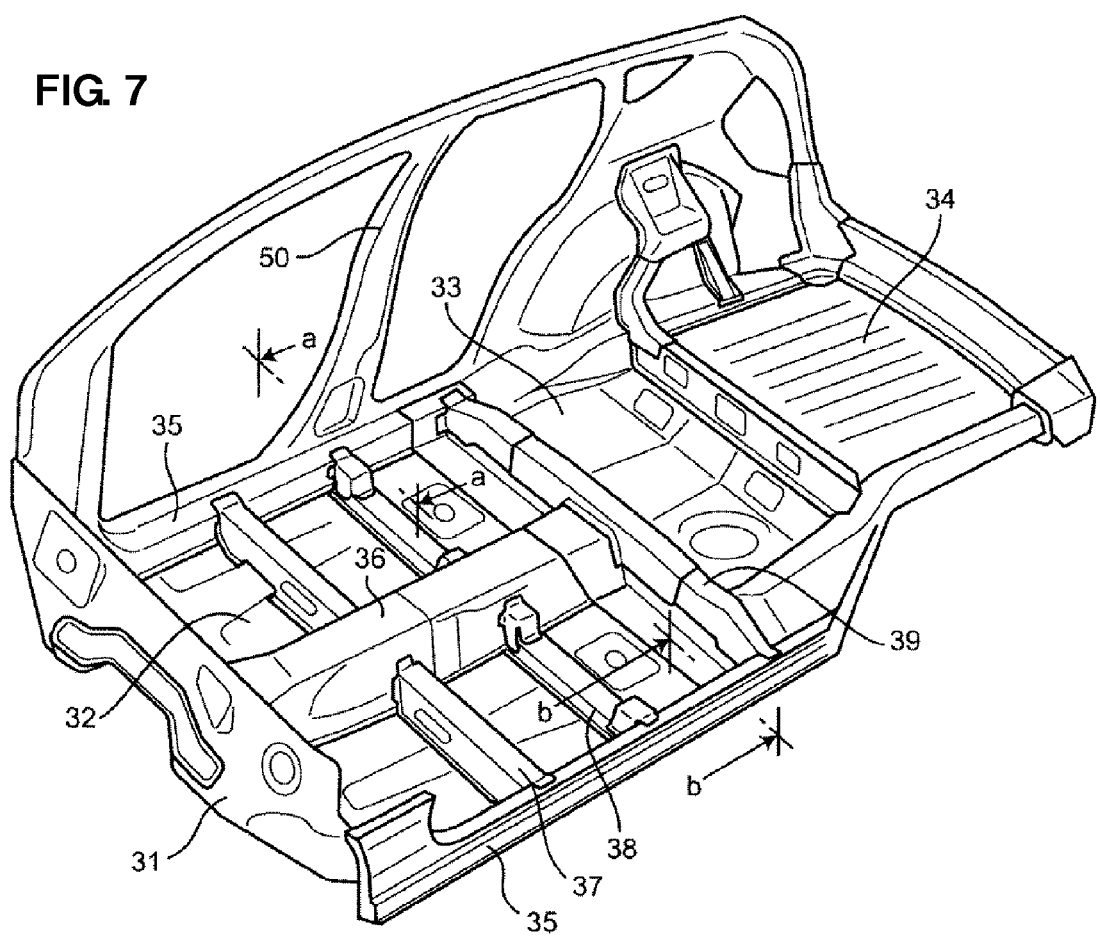
FIG. 7 is a perspective view showing a vehicle body to which first and second embodiments of the present invention are applied.

FIG. 7 shows a structure of the vehicle body to which the first and second embodiments are applied. As shown in FIG. 7, a front portion of a vehicle compartment is formed by a dash panel 31, and a bottom portion of that is formed by a floor panel 32. In a rear portion of the vehicle compartment, a bottom portion is formed by a center floor pan 33 which is continuous to the floor panel 32, and a trunk floor pan 34 is provided in front of the center floor pan 33 to rise stepwise.

Further, a pair of side sills 35 which extends in a longitudinal direction is provided at both side portions of the floor panel 32. A tunnel reinforcement 36 which extends from the dash panel 31 to a front end portion of the center floor pan 33 is arranged at a central portion, in a vehicle width direction, of the floor panel 32. Between the both-side side sills 35 and the tunnel reinforcement 36 are provided a No. 2 cross member 37 and a No. 2.5 cross member 38 which extend in the vehicle width direction, respectively. Additionally, a No. 3 cross member 39 is provided at a border of the floor panel 32 and the center floor panel 33. Moreover, a center pillar 50 which extends vertically from side sill 35 at each side portion of the vehicle body. In FIG. 7, illustration of members which constitute a left side portion of the vehicle body, such as the center pillar 50, is omitted in order to help understanding of the structure of the vehicle body.

The first embodiment will be described referring to FIGS. 8 through 10. The first embodiment is applied to a joint portion of the side sill 35 to the No. 2.5 cross member 38. Herein, while the right-side side sill 35 and its surrounding members will be described in the following descriptions regarding the first embodiment, the left-side side sill 35 and its surrounding members are substantially the same as these.

Figure 8:
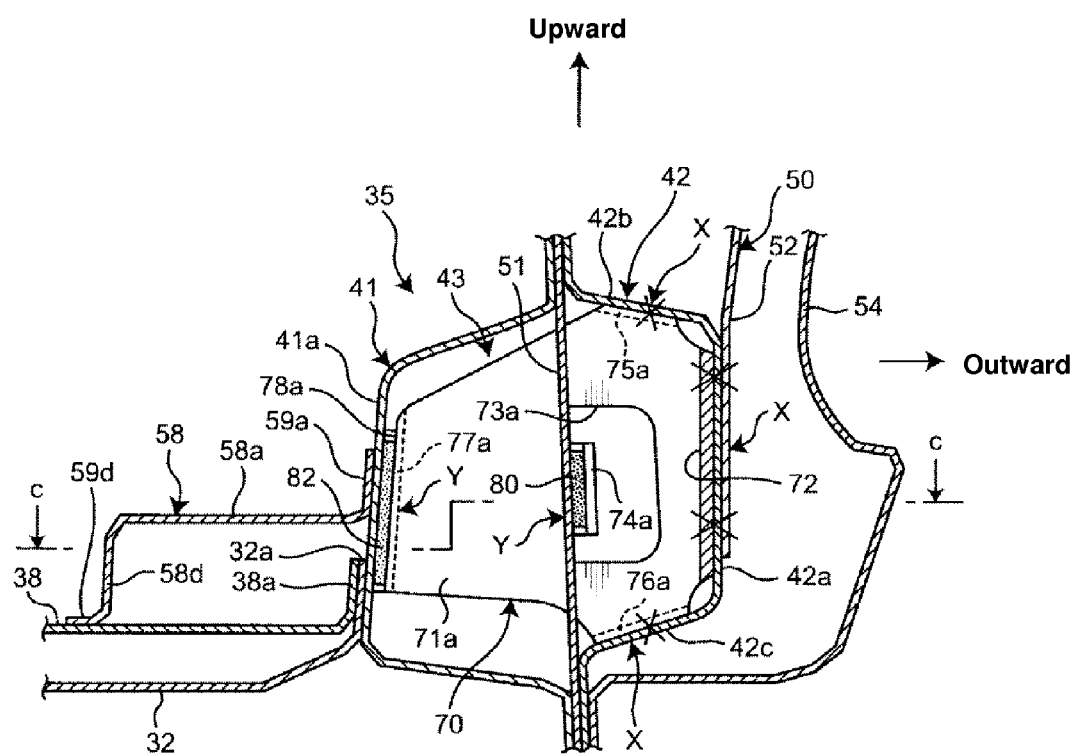
FIG. 8 is a sectional view of a vehicle-body structure according to the first embodiment taken along line a-a of FIG. 7.
Figure 9:
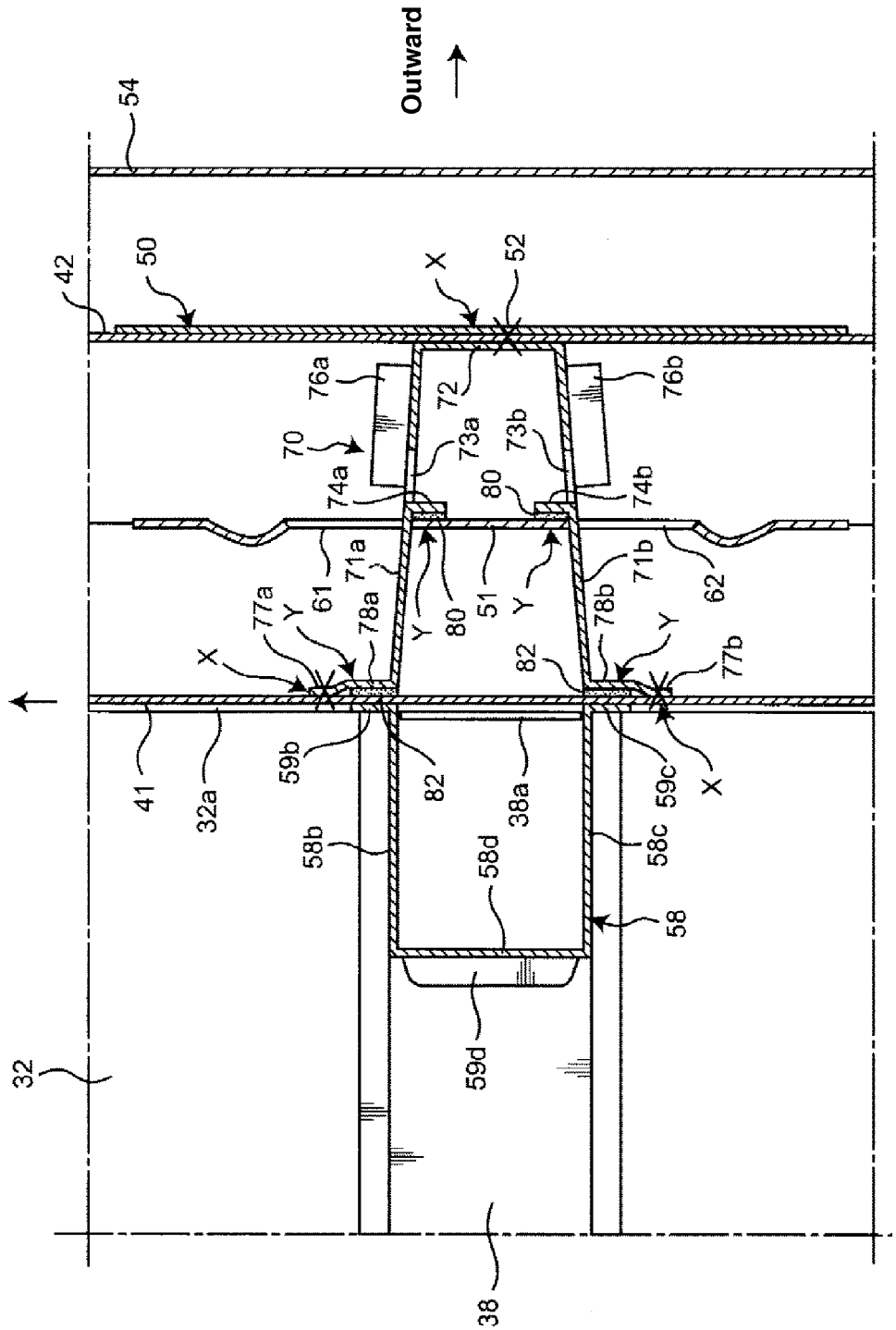
FIG. 9 is a sectional view of the vehicle-body structure according to the first embodiment taken along line c-c of FIG. 8.

As shown in FIGS. 8 and 9, the side sill 35 comprises a side sill inner 41 which has a U-shaped section opening toward the outside in the vehicle width direction and a side sill outer 42 which has a U-shaped section opening toward the inside in the vehicle width direction. The side sill inner 41 and the side sill outer reinforcement 42 are joined at their upper-and-lower both end portions, which form a closed-section portion 43 which extends in the longitudinal direction continuously.

The center pillar 50 comprises a center pillar inner (hereinafter, referred to as "pillar inner") 51 and a center pillar outer reinforcement (hereinafter, referred to as "pillar outer reinforcement") 52. These pillar inner 51 and pillar outer reinforcement 52 are formed to extend vertically as well as longitudinally.

The pillar inner 51 is provided to penetrate the above-described closed-section portion 43, which functions as a partition member which partitions the inside of the closed-section portion 43 into the right side and the left side. A lower end portion of the pillar inner 51 extends over between a pair of upper-and-lower joint portions of the side sill inner 41 and the side sill outer reinforcement 42. The pillar inner 51 is located between the both flanges of the side sill inner 41 and the side sill outer reinforcement 42, and welded to these both flanges. As shown in FIG. 9, a pair of opening portions 61, 62 is formed longitudinally at the pillar inner 51 so as to avoid any interference of the pillar inner 51 with a bulkhead 70, which will be described later. The shape of the opening portions 61, 62 is not limited to a particular shape, and these portions 61, 62 may be formed by a slot which is long vertically or a slit which opens downward, for example.

Meanwhile, a lower end portion of the pillar outer reinforcement 52 is welded to a vertical face portion 42a of the side sill outer reinforcement 42. Further, a side frame outer 54 is provided on the outside, in the vehicle width direction, of the lower end portion of the pillar outer reinforcement 52. A lower end portion of the side frame outer 54 is located on the outside of a lower flange of the side sill outer reinforcement 42, and is welded to respective lower flanges of the side sill inner 41 and the side sill outer reinforcement 42 and the pillar inner 51, so that these are all joined together. The side frame outer 54 is integrally formed by a side sill outer, a roof rail outer, a hinge pillar outer, a center pillar outer, a rear pillar outer, a front pillar outer, and a rear fender.

Flanges 32a, 38a which open upward are provided at respective outside end portions, in the vehicle width direction, of the floor panel 32 and the No. 2.5 cross member 38. The flanges 32a, 38a are joined by welding together with a lower end portion of a vertical face portion 41a of the side sill inner 41. Additionally, the No. 2.5 cross member 38 has a seat bracket 58 at its outside end portion.

The seat bracket 58 comprises a horizontal portion 58a which is arranged above the No. 2.5 cross member 38, a front-side vertical face portion 58b which extends downward from a front end of the horizontal portion 58a, a rear-side vertical face portion 58c which extends downward from a rear end of the horizontal portion 58a, and an inside vertical face portion 58d which extends downward from an inside end portion of the horizontal portion 58a. Herein, the seat bracket 58 opens outward and downward, and is arranged along an upper face of the No. 2.5 cross member 38 and the vertical face portion 41a of the side sill inner 41, so that the open side of the seat bracket 58 is covered with these members. A flange 59d which extends inward is formed at a lower end of the inside vertical face portion 58d of the seat bracket 58, and this flange 59d is joined to an upper face of the No. 2.5 cross member 38 by welding. Further, flanges 59a, 59b, 59c are respectively formed at outside end portions of the horizontal portion 58a, the front-side vertical face portion 58b and the rear-side vertical face portion 58c of the seat bracket 58. The respective flanges 59a, 59b, 59c are welded to the vertical face 41a of the side sill inner 41.

A bulkhead 70 is provided in the closed-section portion 43 of the side sill 35, which partitions the closed-section portion 43 into the front side and the rear side.

Figure 10:
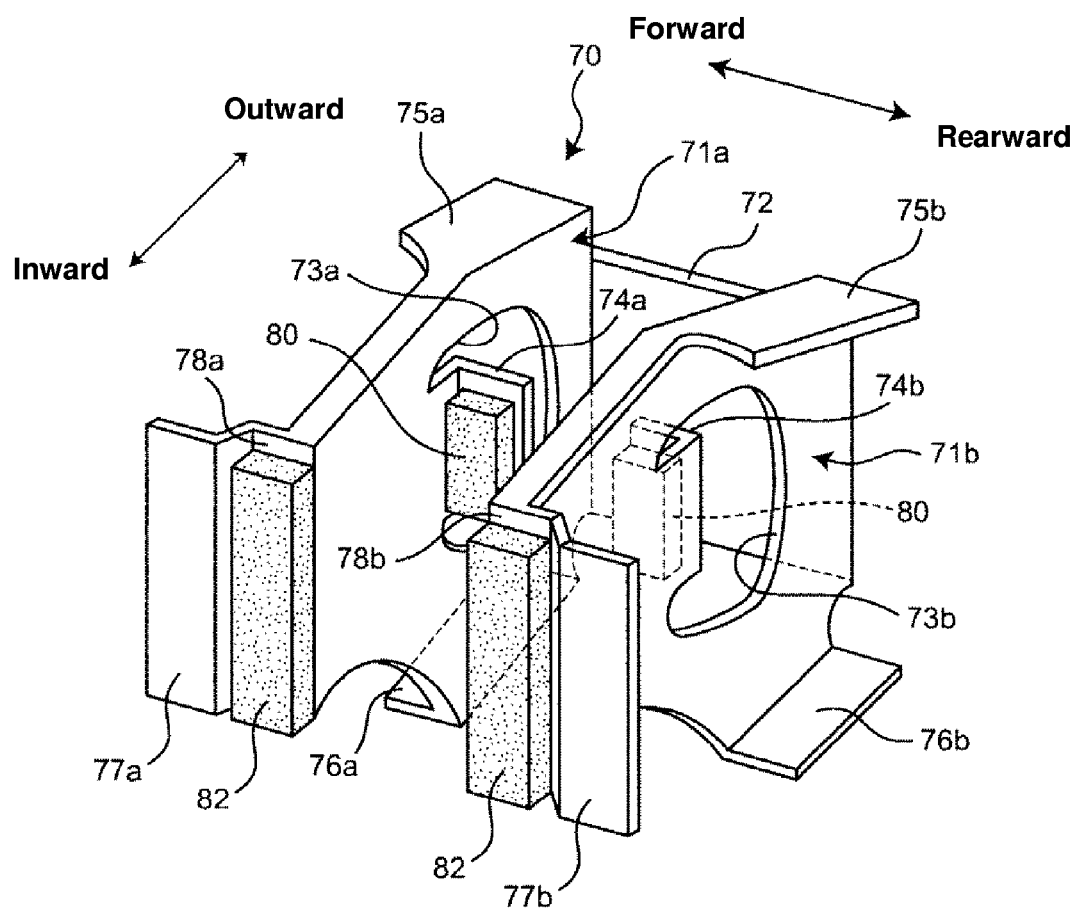
FIG. 10 is a perspective view showing a bulkhead according to the first embodiment.

The bulkhead 70 comprises, as shown in FIG. 10, a pair of partition wall portions 71a, 71b which partition the inside of the closed-section portion 43 longitudinally and a connection portion 72 which interconnects the pair of partition wall portions 71a, 71b. Opening portions 73a, 73b are formed at respective central portions of the partition wall portions 71a, 71b, and central flanges 74a, 74b are provided at respective inside edge portions of the opening portions 73a, 73b and extend toward the other of these flanges 74a, 74b. Further, upper flanges 75a, 75b are formed at respective upper edges of the partition wall portions 71a, 71b, lower flanges 76a, 76b are formed at respective lower edges of the partition wall portions 71a, 71b, and inside flanges 77a, 77b are formed at respective inside edge portions of the partition wall portions 71a, 71b. These flanges 75a, 75b, 76a, 76b, 77a, 77b extend respectively in a specified direction which is away from the other of the partition wall portions 71a, 71b. At the inside flanges 77a, 77b are provided seat portions 78a, 78b which are formed in a recess shape so as to accommodate viscoelastic members 82 therein, which will be described later.

As shown in FIGS. 8 and 9, the bulkhead 70 is arranged in the closed-section portion 43 of the side sill 35, avoiding its interference with the pillar inner 51, by disposing the pair of partition wall portions 71a, 71b in the opening portions 61, 62 of the pillar inner 51.

The bulkhead 70 is joined to an inner face of the side sill inner 41 at its portion which is located on one side of the pillar inner 51 and to an inner face of the side sill outer reinforcement 42 at its portion which is located on the other side of the pillar inner 51. The bulkhead 70 is also joined to the pillar inner 51 at its portion which is located in the vicinity of the above-described opening portions 61, 62.

The respective connection portions of the bulkhead 70 will be described specifically. Firstly, the connection portion 72 of the bulkhead 70 is joined to the vertical face portion 42a of the side sill outer reinforcement 42, the upper flanges 75a, 75b of the bulkhead 70 are joined to an upper-side horizontal face portion 42b of the side sill outer reinforcement 42, and the lower flanges 76a, 76b of the bulkhead 70 are joined to a lower-side horizontal face portion 42c of the side sill outer reinforcement 42 by spot welding, respectively. These welding portions constitute rigid joint portions X.

The central flanges 74a, 74b of the bulkhead 70 are disposed to face to an outside face of a specified portion of the pillar inner 51 which is located between the pair of opening portions 61, 62. These central flanges 74a, 74b and the pillar inner 51 are joined via viscoelastic members 80 as a vibration damping member at these facing portions, which constitute flexible joint portions Y.

The viscoelastic member 80 generates (stores) the strain energy and transfers the strain energy to the thermal energy, whereby the strain energy can be dispersed. Thus, the viscoelastic member 80 can reduce the vibrations. While this viscoelastic member can be joined to the both joint faces by an adhesive agent or its own viscosity, it may be joined by coating. Further, the viscoelastic member 80 is preferably placed between the both joint face portions in its compressive state, whereby a high pressing force against the both joint face portions can be obtained. A material of the viscoelastic member 80 is not limited to a particular one, but a silicon-based material or an acryl-based material, for example, can be used. Herein, the constitution of the viscoelastic member 80 described in this paragraph is applicable to all other vibration reduction members than the viscoelastic member 80 described in this specification, and hereinafter the similar descriptions are omitted.

Moreover, the inside flanges 77a, 77b of the bulkhead 70 are disposed to face to the vertical face portion 41a of the side sill inner 41 and joined to this portion 41a via the viscoelastic members 82, which constitute the flexible joint portions Y as well. As shown in FIG. 9, respective tip-side portions of the inside flanges 77a, 77b beyond the seat portions 78a, 78b are joined to the vertical face portion 41a of the side sill inner 41 by spot welding, which constitute the rigid joint portions X. Additionally, the joint portions of the inside flanges 77a, 77b of the bulkhead 70 and the side sill inner 41 are provided to overlap, in the longitudinal direction, the joint portions of the No. 2.5 cross member 38 and the side sill inner 41, specifically, the joint portions of the flanges 59b, 59c of the seat bracket 58, which is a forming member of the No. 2.5 cross member 38, and the side sill inner 41.

According to the structure of the side sill 35 according to the first embodiment, the rigidity of the side sill 35 can be improved by the bulkhead 70 provided in the closed-section portion 43, so that any deformation of the side sill 35, collapse of the closed-section portion 43, and the like can be restrained. Further, the bulkhead 70 can be firmly joined to the side sill outer reinforcement 42 with the above-described rigid joint portions X, thereby ensuring the above-described rigid-improvement effect, and the vibration of the side sill 35 can be reduced with the flexible joint portions Y, thereby restraining the vibration transmission to passengers in the vehicle compartment.

Subsequently, an example of manufacturing steps of the side sill 35 according to the first embodiment will be described referring to FIGS. 8 and 9.

Firstly, the bulkhead 70 is joined to the inner face of the side sill outer reinforcement 42. The joint portions to the side sill outer reinforcement 42 are the above-described three rigid joint portions X. Next, the lower end portion of the pillar outer reinforcement 52 is joined to the outer face of the side sill outer reinforcement 42 to which the bulkhead 70 is joined, and the side frame outer 54 is joined to the outer face of the pillar outer reinforcement 52 and the outer face of the lower flange of the side sill outer reinforcement 42. Subsequently, the side frame outer 54 which is integrally formed by the bulkhead 70, the side sill outer reinforcement 42 and the pillar outer reinforcement 52 is joined to the pillar inner 51. Herein, specifically, the pair of partition wall portions 71a, 71b of the bulkhead 70 and the inside flanges 77a, 77b of the respective partition wall portions 71a, 71b are inserted into the opening portions 61, 62 of the pillar inner 51 from the outside in the vehicle width direction, and then the central flanges 74a, 74b of the bulkhead 70 are joined to the outside face of the pillar inner 51 via the viscoelastic members 80. The viscoelastic members 80 may be previously made adhere or applied to the central flanges 74a, 74b.

Next, the side sill inner 42 to which the floor panel 32, the No. 2.5 cross member 38 and the seat bracket 58 are previously joined is joined to the side frame outer 54 to which the pillar inner 51 is joined as described above. Specifically, the upper flange of the side sill inner 41 is joined to the upper flange of the side sill outer reinforcement 42 and the pillar inner 51 by welding, and the lower flange of the side sill inner 41 is joined to the lower flange of the side sill outer reinforcement 42, the pillar inner 51 and side frame outer 54 by welding. Also, the inside flanges 77a, 77b of the bulkhead 70 are joined to the vertical face portion 41a of the side sill inner 41 by the viscoelastic members 82 previously made adhere or applied to the inside flanges 77a, 77b as well as the one-side welding. Thus, the side sill 35 equipped with the bulkhead 70 provided in the closed-section portion 43 is completed.

The second embodiment will be described referring to FIGS. 11 through 13. The second embodiment is applied to a central portion between the joint portion of the side sill 35 to the No. 2.5 cross member 38 and the joint portion of the side sill 35 to the No. 3 cross member 39, and a rear end portion of the center pillar 50 is disposed at this application portion.

Herein, while the left-side side sill 35 and its surrounding members will be described in the following descriptions regarding the second embodiment, the right-side side sill 35 and its surrounding members are substantially the same as these. Further, since the side sill 35, the center pillar 50 and the floor panel 32 of the second embodiment are comprised of the same members as those of the first embodiment, descriptions of these existent members are omitted here.

Figure 11:
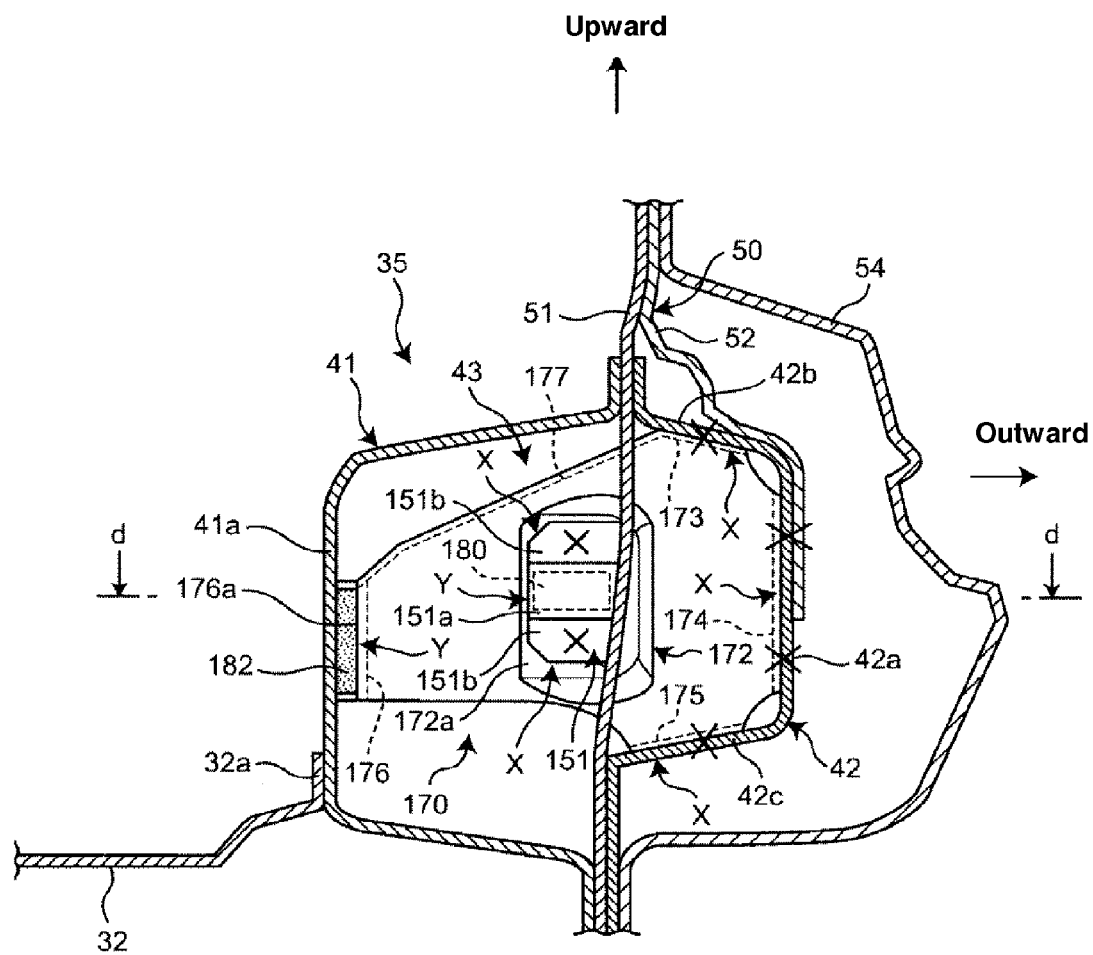
FIG. 11 is a sectional view of a vehicle-body structure according to a second embodiment taken along line b-b of FIG. 7.
Figure 12:
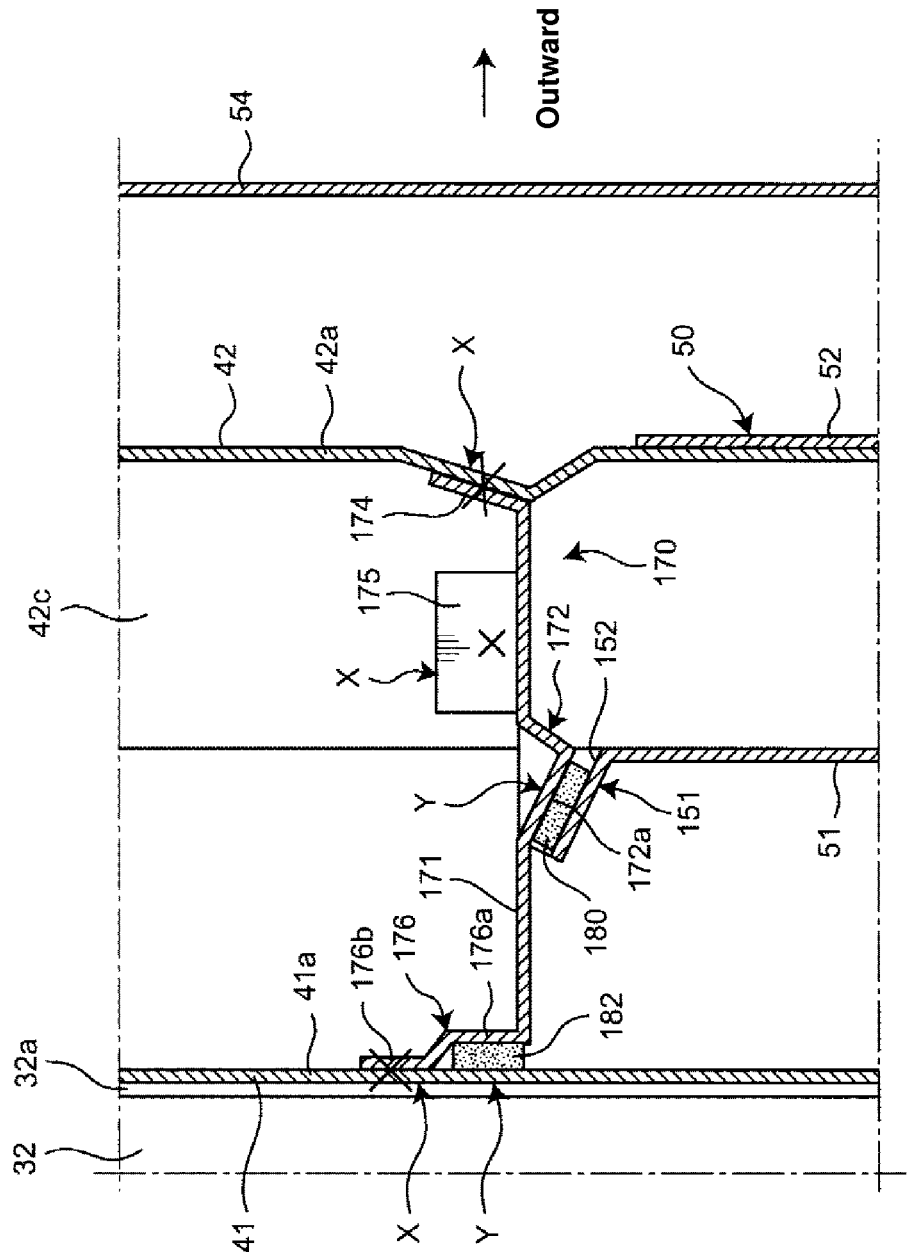
FIG. 12 is a sectional view of the vehicle-body structure according to the second embodiment taken along line d-d of FIG. 11.

FIG. 11 is a sectional view of the left-side side sill 35 taken along line b-b of FIG. 7 which corresponds to a position of the rear end portion of the center pillar 50, and FIG. 12 is a sectional view of the left-side side sill 35 taken along line d-d of FIG. 11. As shown in FIGS. 11 and 12, a bulkhead 170 which partitions the closed-section portion 43 longitudinally into the front side and the rear side is provided in the closed-section portion 43 in the second embodiment as well. The bulkhead 170 is joined to the rear end portion of the pillar inner 51. A flange 151 which extends obliquely rearward and inward is formed at the rear end portion of the pillar inner 51, and this flange 151 comprises a first face portion 151a as a seat portion for disposition of a viscoelastic member 180, which will be described later, and a pair of upper-and-lower second face portions 151b which are disposed above and below as well as in back of the first face portion 151a.

Figure 13:
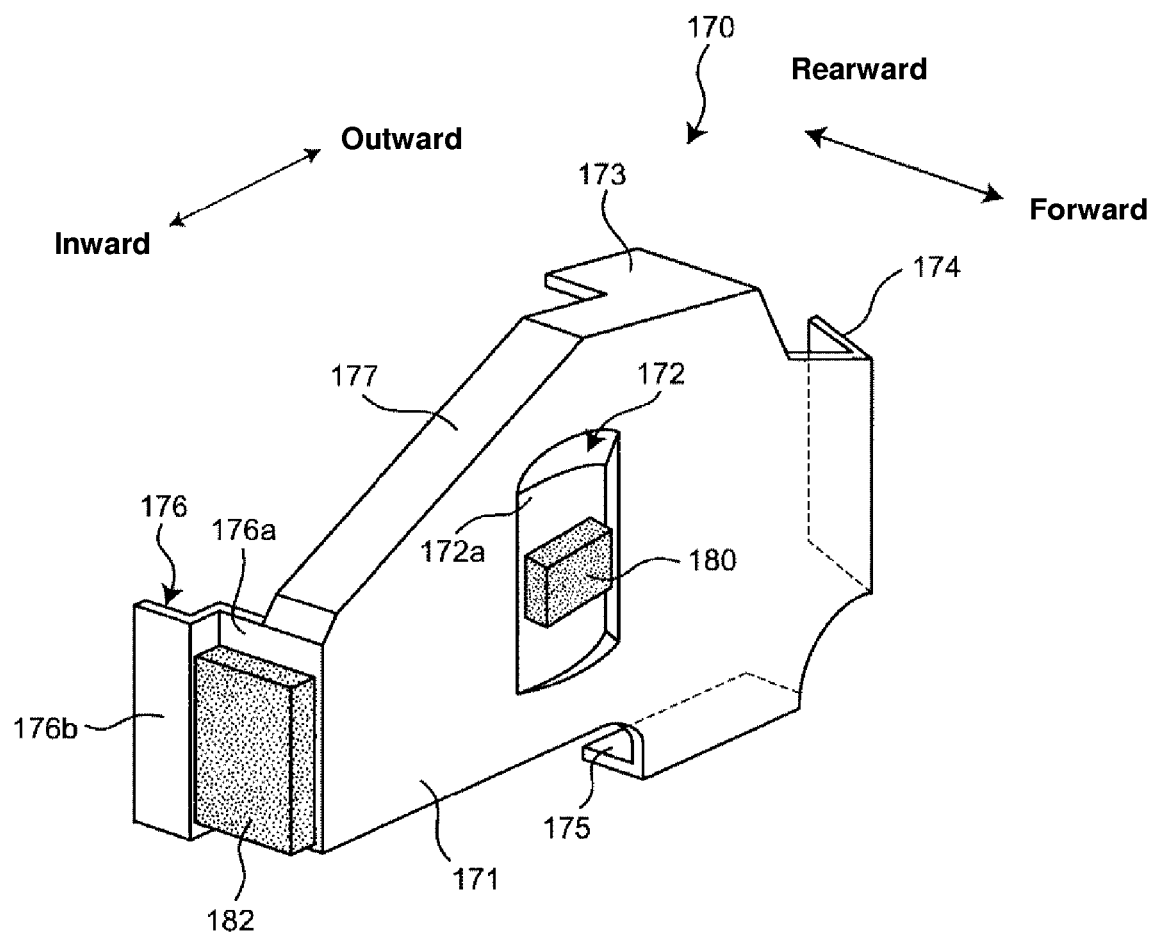
FIG. 13 is a perspective view showing a bulkhead according to the second embodiment.

As shown in FIG. 13, the bulkhead 170 comprises a partition wall portion 171 which partitions the inside of the closed-section portion 43 longitudinally. At a central portion of the partition wall portion 171 is formed a protrusion portion 172 which protrudes forward, and a slant face 172a which slants obliquely outward and forward is formed at the protrusion portion 172. Further, an upper flange 173b is formed at an upper edge of the partition wall portion 171, an outside flange 174 is formed at an outside edge portion of the partition wall portion 171, a lower flange 175 is formed at a lower edge of the partition wall portion 171, and an inside flange 176 is formed at an inside edge portion of the partition wall portion 171. These flanges extend rearward. The inside flange 176 is formed stepwise in a plan view, and includes a first face portion 176a as a seat portion for disposition of an viscoelastic member 182, which will be described later, and a second face portion 176b which is positioned on the inside of the first face portion 176a.

As shown in FIGS. 11 and 12, the bulkhead 170 is provided in the closed-section portion 43 of the side sill 35, avoiding its interference with the pillar inner 51, by being disposed in back of the rear end portion of the pillar inner 51.

The bulkhead 170 is joined to the inner face of the side sill inner 41 at its portion which is located on one side of the pillar inner 51 and to the inner face of the side sill outer reinforcement 42 at its portion which is located on the other side of the pillar inner 51. The bulkhead 170 is also joined to the rear end portion of the pillar inner 51.

The respective connection portions of the bulkhead 170 will be described specifically. Firstly, the upper flange 173 of the bulkhead 170 is joined to the upper-side horizontal face portion 42b of the side sill outer reinforcement 42, the outside flange 174 of the bulkhead 170 is joined to the vertical face portion 42a of the side sill outer reinforcement 42, and the lower flange 175 of the bulkhead 170 is joined to the lower-side horizontal face portion 42c of the side sill outer reinforcement 42 by spot welding, respectively. These welding portions constitute rigid joint portions X.

Further, the slant face 172a at the central portion of the bulkhead 170 is provided to face to the first face portion 151a and the upper-and-lower pair second face portions 151b of the flange 151 which is provided at the rear end portion of the pillar inner 51. The slant face 172a of the bulkhead 170 is joined to the first face portion 151a of the pillar inner 51 via the viscoelastic member 180 as a vibration damping member, which constitutes the flexible joint portion Y. Additionally, the slant face 172a of the bulkhead 170 is joined to the respective second face portions 172b of the pillar inner 51 by spot welding, which constitutes the flexible joint portion X.

Moreover, the first face portion 176a and the second face portion 176b at the inside flange 176 of the bulkhead 170 are provided to face to the vertical face portion 41a of the side sill inner 41. The first face portion 176a of the bulkhead 170 is joined to the vertical face portion 41a of the side sill inner 41 via the viscoelastic member 182 as the vibration damping member provided at the first face portion 176a, which constitutes the flexible joint portion Y. Meanwhile, the second face portion 176b of the bulkhead 170 is joined to the vertical face portion 41a of the side sill inner 41 by spot welding, which constitutes the flexible joint portion X.

According to the structure of the side sill 35 according to the second embodiment, like the first embodiment, the rigidity of the side sill 35 can be improved by the bulkhead 170 provided in the closed-section portion 43, so that any deformation of the side sill 35, collapse of the closed-section portion 43, and the like can be restrained. Further, the bulkhead 170 can be firmly joined to the side sill outer reinforcement 42, the side sill inner 41, and the rear end portion of the pillar inner 51 with the above-described rigid joint portions X, thereby ensuring the above-described rigid-improvement effect, and the vibration of the side sill 35 can be reduced with the flexible joint portions Y, thereby restraining the vibration transmission to passengers in the vehicle compartment.

Subsequently, an example of manufacturing steps of the side sill 35 according to the second embodiment will be described referring to FIGS. 11 and 12.

Firstly, the bulkhead 170 is joined to the inner face of the side sill outer reinforcement 42. The joint portions to the side sill outer reinforcement 42 are the above-described three rigid joint portions X. Next, the lower end portion of the pillar outer reinforcement 52 is joined to the outer face of the side sill outer reinforcement 42 to which the bulkhead 170 is joined, and the side frame outer 54 is joined to the outer face of the pillar outer reinforcement 52 and the outer face of the lower flange of the side sill outer reinforcement 42. Subsequently, the flange 151 at the rear end portion of the pillar inner 51 is provided to face to the slant face 172a of the bulkhead 170 which is integrally formed with the side frame outer 54 as described above via the viscoelastic member 180 previously made adhere or applied to the first face portion 151a of the flange 151, and joined together by the spot welding and the viscoelastic member 180. Also, the pillar inner 51 is joined to the inner face of the pillar outer reinforcement 52 by welding above the side sill outer reinforcement 42.

Next, the side sill inner 42 to which the floor panel 32, the No. 2.5 cross member 38 and the seat bracket 58 are previously joined is joined to the side frame outer 54 to which the pillar inner 51 is joined, as described above. Specifically, the upper flange of the side sill inner 41 is joined to the upper flange of the side sill outer reinforcement 42 and the pillar inner 51 by welding, and the lower flange of the side sill inner 41 is joined to the lower flange of the side sill outer reinforcement 42, the pillar inner 51 and side frame outer 54 by welding. Also, the inside flange 176 of the bulkhead 170 is joined to the vertical face portion 41a of the side sill inner 41 by the viscoelastic member 182 previously made adhere or applied to the inside flange 176 as well as the one-side welding. Thus, the side sill 35 equipped with the bulkhead 170 provided in the closed-section portion 43 is completed.

The present invention should not be limited to the above-described embodiments.

For example, while the above-described embodiments describe the case in which the closed-section portion is formed by the side sill inner and the side sill outer reinforcement, the present invention is applicable to a case in which that is formed by any other one or more (at least one) vehicle-body forming member than the side sill inner and the side sill outer.

Further, while the above-described embodiments describe the case in which the side sill inner and the side sill outer reinforcement which form the closed-section portion are joined at their upper and lower joint portions, the both members may be joined at three or more positions when the closed-section portion is formed by two sheets of vehicle-body forming member.

Moreover, while the above-described embodiments describe the case in which the center pillar inner as the partition member which partitions the inside of the closed-section portion is provided, the present invention is not limited to the center pillar inner as the partition member.

Additionally, while the above-described embodiments describe the case in which the rigid joint portion is constituted by the welding, the present invention is not limited to this welding joint, but any other joint manner, such as bolt-nut fastening, may be used.

What is claimed is:

1. A vehicle-body structure of a vehicle, comprising:
   at least one vehicle-body forming member forming a closed-section portion continuously in a specified direction;
   a partition member extending in the specified direction and partitioning an inside of the closed-section portion of said vehicle-body forming member; and
   a bulkhead provided in the closed-section portion of said vehicle-body forming member and joined to the vehicle-body forming member,
   wherein said bulkhead is joined to an inner face of the vehicle-body forming member at specified positions which are located on both sides of said partition member, the bulkhead is joined to the partition member, and a joint portion of said vehicle-body forming member and said bulkhead includes a rigid joint portion where the vehicle-body forming member and the bulkhead are joined with a direct contact thereof and a flexible joint portion where the vehicle-body forming member and the bulkhead are joined via a damping member provided therebetween.

2. The vehicle-body structure of a vehicle of claim 1, wherein said damping member is a viscoelastic member having physical properties which fall within a range enclosed by six coordinate points: (1, 0.4), (1, 0.2), (10, 0.1), (2000, 0.1), (10000, 0.2) and (10000, 0.4) in an X-Y coordinate system with X axis of the storage modulus and Y axis of the loss factor, or a range exceeding the loss factor of 0.4.

3. A vehicle-body structure of a vehicle, comprising:

a side sill extending in a vehicle longitudinal direction, the side sill including a side sill inner and a side sill outer reinforcement which are joined together via a pair of joint portions so as to form a closed-section portion continuously in a specified direction inside the side sill;

a pillar extending vertically, the pillar including a pillar inner which has a lower end portion thereof which partitions the inside of the closed-section portion of the side sill and extends in the specified direction, the lower end portion of the pillar inner being provided to extend over the pair of joint portions of the side sill inner and the side sill outer reinforcement; and a bulkhead provided in the closed-section portion of the side sill;

wherein said bulkhead is joined to respective inner faces of said side sill inner and said side sill outer reinforcement and a portion of the lower end portion of said pillar inner.

* * * * *